(12) United States Patent
Myers et al.

(10) Patent No.: US 6,407,846 B1
(45) Date of Patent: Jun. 18, 2002

(54) PHOTONIC WAVELENGTH SHIFTING METHOD

(75) Inventors: Michael H. Myers; Juan C. Riley, both of San Diego, CA (US); Charles D. Melville, Issaquah, WA (US); Arkady S. Bablumyan, LaJolla; Clark C. Guest, San Diego, both of CA (US)

(73) Assignee: All Optical Networks, Inc., San Diego, CA (US)

( * ) Notice: Subject to any disclaimer, the term of this patent is extended or adjusted under 35 U.S.C. 154(b) by 0 days.

(21) Appl. No.: 09/810,888

(22) Filed: Mar. 16, 2001

(51) Int. Cl.$^7$ .................... G02B 26/00; G02B 6/28; G02F 1/01; H04J 14/02
(52) U.S. Cl. .................... 359/239; 359/124; 385/24
(58) Field of Search .............. 359/238, 243, 359/244, 341, 113, 114, 130, 115, 118, 121, 124–128, 133, 158, 189, 195, 246, 326, 239; 385/20, 21.17, 18, 7, 36, 24, 22, 37, 39, 46, 5

(56) References Cited

U.S. PATENT DOCUMENTS

| | | | |
|---|---|---|---|
| 4,262,362 A | 4/1981 | Kiernan et al. ............. 455/612 |
| 4,301,543 A | 11/1981 | Palmer ....................... 455/612 |
| 4,625,333 A | 11/1986 | Takezawa et al. .......... 455/612 |
| 4,726,011 A | 2/1988 | Ih et al. ....................... 370/3 |
| 4,729,620 A | 3/1988 | Pavlath .................... 350/96.15 |
| 4,742,576 A | 5/1988 | McMahon .................. 455/617 |
| 4,773,063 A | 9/1988 | Hunsperger et al. .......... 370/3 |
| 4,807,227 A | 2/1989 | Fujiwara et al. ............. 370/3 |
| 4,832,437 A | 5/1989 | Kim et al. ................ 350/96.15 |
| 4,833,681 A | 5/1989 | Akiyama et al. ............ 372/32 |
| 4,860,279 A | 8/1989 | Falk et al. ..................... 370/1 |
| 4,870,641 A | 9/1989 | Pattavina .................... 370/60 |
| 4,893,352 A | 1/1990 | Welford ..................... 455/610 |
| 4,896,327 A | 1/1990 | Ebberg ........................ 372/32 |
| 4,904,038 A | 2/1990 | Chang .................... 350/96.14 |
| 4,959,826 A | 9/1990 | Smith ........................... 370/1 |
| 4,989,199 A * | 1/1991 | Rzeszewski ................ 359/123 |
| 4,989,200 A | 1/1991 | Olshansky et al. ............ 370/3 |
| 4,989,212 A | 1/1991 | Mecherle ..................... 372/26 |
| 5,022,732 A | 6/1991 | Engan et al. ............. 350/96.15 |
| 5,023,949 A | 6/1991 | Auracher et al. ........... 455/618 |
| 5,029,978 A | 7/1991 | Curtis et al. ............. 350/96.29 |
| 5,050,952 A | 9/1991 | Fussgäger ................... 359/114 |
| 5,058,101 A | 10/1991 | Albanese et al. ........... 359/127 |
| 5,063,568 A | 11/1991 | Chiba et al. ................. 372/32 |
| 5,068,864 A | 11/1991 | Javan .......................... 372/32 |
| 5,081,712 A | 1/1992 | Meissner .................... 359/191 |
| 5,095,480 A | 3/1992 | Fenner ...................... 370/94.1 |
| 5,101,291 A | 3/1992 | Jopson ....................... 359/124 |
| 5,101,450 A | 3/1992 | Olshansky ..................... 385/3 |
| 5,134,509 A | 7/1992 | Olshansky et al. ......... 359/132 |
| 5,134,624 A | 7/1992 | Ono ............................ 372/32 |
| 5,148,437 A | 9/1992 | Ohtsu ......................... 372/32 |
| 5,153,933 A | 10/1992 | Smith et al. ................. 385/27 |

(List continued on next page.)

Primary Examiner—Georgia Epps
Assistant Examiner—William Choi
(74) Attorney, Agent, or Firm—Gary L. Eastman

(57) ABSTRACT

A method for photonic wavelength shifting and stabilization is described. The method receives a photonic signal, comprised of one or more channels, and provides a wavelength shifted, stabilized, and channelized photonic signal. Data encoding is also supported. A modulation synthesizer provides a modulation waveform embedded with the shifting, stabilization and data encoding mechanisms. A variety of modulation techniques are supported. The modulation waveform is optimized for the particular modulation technique. A wavelength error detector provides feedback to the modulation synthesizer. The error signal is used to stabilize the photonic signal and correct channel wavelength errors. Fixed wavelength channels and spread spectrum channels are supported.

22 Claims, 14 Drawing Sheets

U.S. PATENT DOCUMENTS

| | | | | |
|---|---|---|---|---|
| 5,157,542 | A | 10/1992 | Fitzmartin et al. | 359/278 |
| 5,166,822 | A | 11/1992 | Priatko et al. | 359/287 |
| 5,168,534 | A | 12/1992 | McBrien et al. | 385/3 |
| 5,222,103 | A | 6/1993 | Gross | 375/54 |
| 5,239,400 | A | 8/1993 | Liu | 359/125 |
| 5,265,112 | A | 11/1993 | Noll et al. | 372/32 |
| 5,272,556 | A | 12/1993 | Faulkner et al. | 359/125 |
| 5,301,058 | A | 4/1994 | Olshansky | 359/188 |
| 5,317,441 | A | 5/1994 | Sidman | 319/113 |
| 5,321,718 | A | 6/1994 | Waarts et al. | 372/108 |
| 5,340,980 | A | 8/1994 | Bianchini et al. | 250/214 R |
| 5,351,146 | A | 9/1994 | Chan et al. | 359/118 |
| 5,367,397 | A | 11/1994 | Tajima | 359/152 |
| 5,396,361 | A | 3/1995 | Sasaki et al. | 359/189 |
| 5,398,111 | A | 3/1995 | Cardarelli | 356/350 |
| 5,408,349 | A | 4/1995 | Tsushima et al. | 359/124 |
| 5,416,628 | A | 5/1995 | Betti et al. | 359/181 |
| 5,422,883 | A | 6/1995 | Hauris et al. | 370/62 |
| 5,440,415 | A | 8/1995 | Mekawi et al. | 359/126 |
| 5,440,417 | A | 8/1995 | Chung et al. | 359/134 |
| 5,485,274 | A | 1/1996 | Kremmler | 356/350 |
| 5,495,483 | A | 2/1996 | Grube et al. | 370/95.1 |
| 5,504,609 | A | 4/1996 | Alexander et al. | 359/125 |
| 5,515,196 | A | 5/1996 | Kitajima et al. | 359/180 |
| 5,521,906 | A | 5/1996 | Grube et al. | 370/17 |
| 5,541,755 | A | 7/1996 | Noe et al. | 359/110 |
| 5,546,414 | A | 8/1996 | Pfeiffer | 372/18 |
| 5,553,087 | A | 9/1996 | Telle | 372/32 |
| 5,555,118 | A | 9/1996 | Huber | 359/125 |
| 5,557,439 | A | 9/1996 | Alexander et al. | 359/130 |
| 5,574,584 | A | 11/1996 | Darcie et al. | 359/125 |
| 5,589,684 | A | 12/1996 | Ventrudo et al. | 250/225 |
| 5,589,970 | A | 12/1996 | Lyu et al. | 359/133 |
| 5,596,436 | A | 1/1997 | Sargis et al. | 359/132 |
| 5,642,371 | A | 6/1997 | Tohyama et al. | 372/45 |
| 5,644,665 | A | 7/1997 | Burns et al. | 385/3 |
| 5,680,234 | A | 10/1997 | Darcie et al. | 359/110 |
| 5,691,832 | A | 11/1997 | Liedenbaum et al. | 359/115 |
| 5,691,989 | A | 11/1997 | Rakuljikc et al. | 372/20 |
| 5,694,232 | A | 12/1997 | Parsay et al. | 359/113 |
| 5,694,233 | A | 12/1997 | Wu et al. | 359/117 |
| 5,694,234 | A | 12/1997 | Darcie et al. | 359/125 |
| 5,699,178 | A | 12/1997 | Ostlund | 359/161 |
| 5,712,932 | A | 1/1998 | Alexander et al. | 385/24 |
| 5,715,076 | A | 2/1998 | Alexander et al. | 359/130 |
| 5,717,708 | A | 2/1998 | Mells | 372/32 |
| 5,724,167 | A | 3/1998 | Sabella | 359/128 |
| 5,726,784 | A | 3/1998 | Alexander et al. | 359/125 |
| 5,739,935 | A | 4/1998 | Sabella | 359/125 |
| 5,745,613 | A | 4/1998 | Fukuchi et al. | 385/24 |
| 5,754,714 | A | 5/1998 | Suzuki et al. | 385/5 |
| 5,784,184 | A | 7/1998 | Alexander et al. | 359/125 |
| 5,793,907 | A * | 8/1998 | Jalali et al. | 385/24 |
| 5,808,765 | A | 9/1998 | Laude | 359/130 |
| 5,812,306 | A | 9/1998 | Mizrahi | 359/341 |
| 5,822,471 | A | 10/1998 | McGinnis | 385/1 |
| 5,835,212 | A | 11/1998 | Kissa et al. | 356/345 |
| 5,838,470 | A * | 11/1998 | Radehaus et al. | 359/124 |
| 5,838,851 | A | 11/1998 | Wisseman et al. | 385/32 |
| 5,847,855 | A | 12/1998 | Choa | 359/152 |
| 5,852,505 | A | 12/1998 | Li | 359/118 |
| 5,861,965 | A | 1/1999 | Koren et al. | 359/123 |
| 5,862,165 | A | 1/1999 | Handa et al. | 372/27 |
| 5,864,413 | A | 1/1999 | Feldman et al. | 359/125 |
| 5,867,291 | A | 2/1999 | Wu et al. | 359/124 |
| 5,884,145 | A | 3/1999 | Haartsen | 455/63 |
| 5,886,802 | A | 3/1999 | Majima | 359/124 |
| 5,892,869 | A | 4/1999 | Wisseman et al. | 385/37 |
| 5,896,211 | A | 4/1999 | Watanabe | 359/124 |
| 5,896,476 | A | 4/1999 | Wisseman et al. | 385/37 |
| 5,898,719 | A | 4/1999 | Ryu | 372/32 |
| 5,903,691 | A | 5/1999 | Wisseman et al. | 385/37 |
| 5,912,748 | A | 6/1999 | Wu et al. | 359/117 |
| 5,917,628 | A | 6/1999 | Ooi et al. | 359/135 |
| 5,926,297 | A | 7/1999 | Ishikawa et al. | 359/115 |
| 5,933,554 | A | 8/1999 | Leuthold et al. | 385/28 |
| 5,938,309 | A | 8/1999 | Taylor | 357/124 |
| 5,943,456 | A | 8/1999 | Buchholz et al. | 385/24 |
| 5,946,119 | A | 8/1999 | Bergano et al. | 359/124 |
| 5,949,925 | A | 9/1999 | Seino | 385/1 |
| 5,959,753 | A | 9/1999 | Duling, III et al. | 359/158 |
| 5,963,348 | A | 10/1999 | Öberg | 359/114 |
| 5,963,567 | A | 10/1999 | Veselka et al. | 372/21 |
| 5,999,300 | A | 12/1999 | Davies et al. | 359/183 |
| 6,005,697 | A | 12/1999 | Wu et al. | 359/117 |
| 6,008,931 | A | 12/1999 | von Helmolt et al. | 359/326 |
| 6,009,332 | A | 12/1999 | Haartsen | 455/450 |
| 6,021,309 | A | 2/2000 | Sherman et al. | 455/12.1 |
| 6,034,976 | A | 3/2000 | Mossberg et al. | 372/32 |
| 6,043,926 | A | 3/2000 | Williams | 359/356 |
| 6,055,251 | A | 4/2000 | Ouchi et al. | 372/28 |
| 6,061,369 | A | 5/2000 | Conradi | 372/6 |
| 6,064,681 | A | 5/2000 | Ackerman | 372/32 |
| 6,067,391 | A | 5/2000 | Land | 385/27 |
| 6,069,719 | A | 5/2000 | Mizrahi | 359/124 |
| 6,072,612 | A | 6/2000 | Liou et al. | 359/123 |
| 6,078,414 | A | 6/2000 | Iwano | 359/124 |
| 6,081,358 | A | 6/2000 | Tiemann et al. | 359/125 |
| 6,084,876 | A | 7/2000 | Kwok et al. | 370/379 |
| 6,091,744 | A | 7/2000 | Sorin et al. | 372/20 |
| 6,091,864 | A | 7/2000 | Hofmeister | 385/2 |
| 6,091,865 | A | 7/2000 | Kim et al. | 385/3 |
| 6,094,446 | A | 7/2000 | Tei et al. | 372/32 |
| 6,097,518 | A | 8/2000 | Wu et al. | 359/128 |
| 6,097,525 | A | 8/2000 | Ono et al. | 359/181 |
| 6,101,012 | A | 8/2000 | Danagher et al. | 359/127 |
| 6,115,122 | A | 8/2000 | Bao et al. | 356/345 |
| 6,115,162 | A | 9/2000 | Graves et al. | 359/173 |
| 6,118,564 | A | 9/2000 | Ooi et al. | 359/139 |
| 6,118,565 | A | 9/2000 | Frigo | 359/167 |
| 6,118,566 | A | 9/2000 | Price | 359/181 |
| 6,125,128 | A | 9/2000 | Mizrahi | 372/20 |
| 6,131,023 | A | 10/2000 | Matsuura | 455/301 |
| 6,134,250 | A | 10/2000 | Koren et al. | 372/6 |
| 6,134,253 | A | 10/2000 | Munks et al. | 372/38 |
| 6,137,927 | A | 10/2000 | Keck et al. | 385/24 |
| 6,163,553 | A | 12/2000 | Pfeiffer | 372/6 |
| 6,169,728 | B1 | 1/2001 | Perreault | 370/235 |
| 6,172,790 | B1 | 1/2001 | Tiemann et al. | 359/245 |
| 6,178,036 | B1 | 1/2001 | Yao | 359/334 |
| 6,169,626 | B1 | 2/2001 | Chen et al. | 359/279 |
| 6,201,638 | B1 | 3/2001 | Hall et al. | 359/346 |

* cited by examiner

PHOTONIC WAVELENGTH SHIFTING METHOD

BACKGROUND

1. The Field of the Invention

This invention relates to computer systems, telecommunication networks, and switches therefor and, more particularly, to novel systems and methods for switching and processing photonic information.

2. Background Discussion

Multiplexing is a method for transmitting multiple, distinct signals over a single physical carrier medium. Much of the protocol of computer hardware deals with the encoding and decoding of signals according to some time scheme for maintaining signal integrity and uniqueness from other signals. In conventional time-division types of multiplexing, signals are transmitted within specific time slots or burst positions. In order to prevent individual bits from being transmitted at the same time, each burst of bits may be encoded into a signal and transmitted over the carrier medium at a specific time.

As transmission rates increase, the individual time divisions available for each small quantity of information in a signal are reduced. However, with the advent of photonic processing, the transmission, encoding, and decoding of photonic signals taken from the electromagnetic spectrum, deserve further consideration. In conventional computer systems, as well as conventional telecommunications networks, the switching, routing, and transmission of signals throughout networks and between processors or processes may be a major limiting factor in performance. Typically, transmissions of a signal require encoding of the signal in a carrier medium, according to a protocol or format.

Thereafter, transmission occurs as a physical phenomenon in which light, or other electromagnetic radiation, electrical signals, mechanical transmissions, or the like are transferred between a source and a destination. At the destination, a decoder must then manipulate the physical response to the incoming signals, thus reconstructing original data encoded by the sender. Communications in general may include communications between individual machines. Machines may be network-aware, hardware of any variety, individual computers, individual components within computers, and the like.

Thus, the issue of sending and receiving information or message traffic is of major consequence in virtually all aspects of industrial and commercial equipment and devices in the information age. Whether communications involve sending and receiving information between machines, or telecommunications of data signals, audio signals, voice, or the like over conventional telecommunications networks, the sending and receiving requirements of rapidly encoding and decoding are present.

With the advent of photonic signals and photonic signal processing, new speed limits are being approached by transmission media. Moreover, origination of signals can now be executed literally at light speeds. Accordingly, what is needed is a system for multiplexing photonic signals over photonic carrier media in such a way as to maximize speed, while maintaining the integrity of information.

To be most useful, communications and switching equipment must interface with data channels from a plethora of sources. An ability to transmit and redirect multiple channels simultaneously and independently, increases the capacity and usefulness of transmission, multiplexing and switching equipment Over the years several standard methods have been developed for packing multiple channels onto a single transmission medium. In optical frequency division multiplexing (OFDM) and wavelength division multiplexing (WDM), each channel has a unique wavelength which typically remains constant with time. In spread spectrum systems, all channels may have substantially the same average wavelength with short term variations that are unique to each channel. Typically, sets of orthogonal functions are used to define channel wavelengths. In most systems and applications, it may be desirable that the wavelength of each channel can be described as a function of time, distinct and unique from all other channels. An ability to wavelength shift photonic signals from one channel, whose wavelength can be defined as a function of time, into any other channel would facilitate the transmission, multiplexing and switching of an extremely wide range of photonic signals.

One dilemma in engineering photonic systems is the conversion of signals or information between the electronic and photonic domains. Photonic systems are capable of high transmission rates and distances. Computers and control equipment are typically electronic due to their flexibility, low cost and wide availability. Typically, switching and multiplexing require the conversion of optical signals into electrical signals for processing and control, followed by reconversion into the optical domain for further transmission. An ability to direct and control a photonic stream of data with electronic devices and systems without requiring conversion of the photonic data stream to the electronic domain would leverage the best characteristics of each domain.

While it may be desirable to leave data in the photonic domain when transmitting, multiplexing and switching photonic signals, it is often desirable to encode an electronic data signal onto an existing carrier without additional complexity and cost. An ability to process photonic or electronic data signals with the same mechanism would simplify interfacing with a wide range of communications, process control, and computational equipment.

One difficulty in interfacing a wide variety of photonic equipment is the assignment of channel wavelengths and encoding techniques. Setup and configuration become problematic. An ability to automatically channelize (change the wavelength of a photonic carrier to a given channel) and transparently pass along a data encoded photonic stream across a network of photonic equipment without prior knowledge of the channel wavelengths and encoding techniques would reduce the cost and complexity of deploying photonic equipment.

Another issue in photonic transmission systems is carrier wavelength variability due to component variability, temperature drift, system jitter and other factors. Carrier wavelength variability makes it difficult to densely pack channels onto a transmission medium without collisions occurring, especially when multiplexing channels from multiple sources. Typically, expensive, temperature-compensated, reference lasers or light sources are required to stabilize a photonic signal. Most state-of-the-art photonic transmission systems require conversion to the electronic domain followed by remodulation of a light source and retransmission in order to eliminate any jitter introduced during transmission. An ability to compensate for wavelength variability of existing photonic streams without remodulation and retransmission would increase the capacity and lower the cost of transmission, multiplexing and switching equipment.

BRIEF SUMMARY AND OBJECTS OF THE INVENTION

In view of the foregoing, it is a primary objective of the present invention to provide a method and apparatus for transmitting, multiplexing and switching photonic signals without requiring conversion to the electronic domain. It is also a primary objective of the present invention to provide a method and apparatus for embedding electronic data signals onto existing photonic carriers and signals.

One objective of the invention is to provide a system that facilitates the transmission, multiplexing and switching of an extremely wide range of photonic signals. It is also an objective of the invention to provide a system for multiplexing photonic signals over photonic carrier media in such a way as to maximize speed, while maintaining the integrity of information. Another objective of the invention is the ability to interface with data channels from a plethora of sources, to transmit and redirect those data channels simultaneously and independently. In particular it is desired to wavelength shift photonic signals from one channel, whose wavelength can be defined as a function of time, into any other channel without requiring conversion to and reconversion from the electronic domain. It is also an objective of the invention to automatically channelize and transparently pass along a data encoded photonic stream across a network of photonic equipment without prior knowledge of the channel wavelengths or encoding methods and to compensate for wavelength variability of existing photonic streams without retransmission.

The present invention uses various embodiments to wavelength shift photonic signals. Wavelength shifting is also applied as a mechansim to multiplex, switching and transmit photonic signals. In certain embodiments in accordance with the invention, an apparatus for wavelength shifting uses modulation techniques to change photonic carrier wavelengths. Modulation techniques may be selected to be appropriate to a modulation device of choice. A particular modulation device may be driven by a modulation synthesizer producing a controlling waveform optimized for the device.

Consistent with the foregoing objectives, and in accordance with the invention as embodied and broadly described herein, an apparatus and method are disclosed, in suitable detail to enable one of ordinary skill in the art to make and use the invention.

BRIEF DESCRIPTION OF THE DRAWINGS

The foregoing and other objectives and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
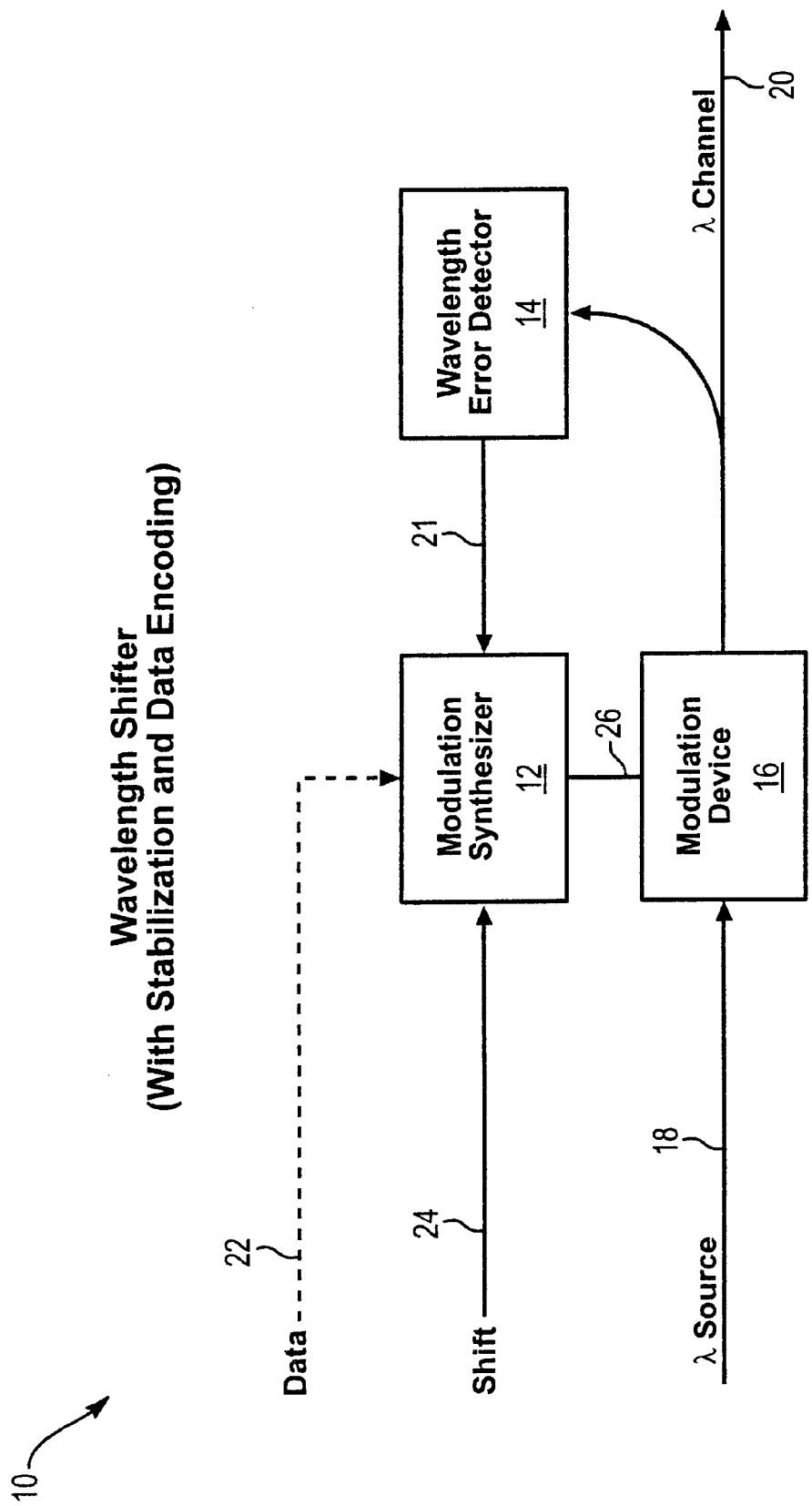
FIG. 1 is a schematic block diagram of a wavelength shifting apparatus in accordance with the invention.

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 14, is not intended to limit the scope of the invention. The scope of the invention is as broad as claimed herein. The illustrations are merely representative of certain, presently preferred embodiments of the invention. Those presently preferred embodiments of the invention will be best understood by reference to the drawings, wherein like parts are designated by like numerals throughout.

Those of ordinary skill in the art will, of course, appreciate that various modifications to the details of the Figures may easily be made without departing from the essential characteristics of the invention. Thus, the following description of the Figures is intended only by way of example, and simply illustrates certain example embodiments consistent with the invention as claimed.

The design, implementation and deployment of photonic systems involves the convergence of a number of disciplines each with their own working vocabularies. Additionally, the novelty of the present invention presents some new terms and concepts. The following definitions therefore are provided for the readers convenience:

Channel: A virtual medium for signal propagation. Channels allow a single medium to carry multiple signals simultaneously.

Channel Spacing: The distance between channels usually expressed in cycles per second.

Wavelength Shifting: The act of changing the wavelength of a photonic signal, particularly the carrier.

Wavelength Variability: A measure of wavelength deviation from an ideal or desired wavelength over a given period of time.

Wavelength Stabilization: The act of reducing wavelength variability.

Wavelength Pattern: The pattern (over time) followed by the wavelength of a photonic signal, particularly the carrier. May be a constant. The present invention associates wavelength patterns with channels.

Channelization: The act of shifting the wavelength of a photonic signal to match the wavelength pattern of a given channel.

Wavelength Signature: An information set that captures the essential elements of the wavelength of a photonic signal such as the pattern, signal jitter, variance etc.

Orthogonal Signals: Signals that do not correlate over a given period of time. Selecting wavelength patterns that are orthogonal helps minimize interference between channels.

Wavelength Division Multiplexing: Combining multiple signals onto a medium where each signal has a different wavelength.

Spread Spectrum Channels: Channels with wavelength patterns that are very dynamic. Usually based on orthogonal functions.

Spreading Function: Essentially a wavelength pattern used to change fixed wavelength channels to spread spectrum channels.

Gathering Function: Essentially a wavelength pattern used to change spread spectrum channels to fixed wavelength channels.

Modulation: The act of varying a frequency, amplitude, phase or similiar characteristic of a signal.

Modulation Waveform: A waveform used to modulate a signal and thereby vary the frequency, amplitude, phase or similar characteristic of a signal. The present invention uses a modulation waveform to drive (i.e. control) a modulation device.

Modulation Synthesizer: A method or apparatus that generates a modulation waveform in response to various control parameters or signals.

Pre-modulation: Modulation of the modulation waveform. The modulation synthesizer of the present invention uses pre-modulation to encode data simultaneous with wavelength shifting.

In optical and photonic systems it is usually more convenient to refer to carriers in terms of wavelength rather than frequency. Despite this preference, channel spacing is usually expressed in frequency units rather than units of length. Throughout this description it is implied that the amount of shifting is expressed in terms of frequency (Hz) while the result (a change in carrier wavelength) is referred to as wavelength shifting.

Referring to FIG. 1 specifically, while generally referring to all the Figures, a wavelength shifter 10 with stabilization and data encoding may include a modulation synthesizer 12, a wavelength error detector 14, and a modulation device 16. The modulation device 16 may receive a photonic signal 18 and provide a channelized photonic signal 20 wherein the wavelength follows a signature or pattern associated with a channel.

The modulation device 16 may receive a photonic signal 18 that may be composite or non-composite. Composite signals may contain a plurality of wavelengths, each wavelength definable as a function of time, while non-composite signals have a single wavelength also definable as a function of time. Regardless of the complexity of the photonic signal 18, the modulation device 16 receives the photonic signal 18 and may provide a channelized photonic signal 20 wherein each wavelength follows a pattern corresponding to a particular channel.

In most embodiments, the modulation device 16 may be a full-duplex device capable of simultaneously modulating signals from both directions. With a full-duplex modulation device 16, the wavelength shifter 10 may be also full-duplex. In full-duplex operation the modulation device 16 receives the photonic signal 18 and provides the channelized photonic signals 20 in each direction. For simplicity, this description is restricted to half-duplex operation unless otherwise noted.

Under proper control, the wavelength shifter 10 may direct a non-composite photonic input into any one of an arbitrary number of output channels. Composite signals may be similarly directed. For example, a composite signal comprised of multiple wavelengths that are equally spaced by a fixed frequency interval, may be shifted up or down as a group by an arbitrary frequency to occupy a new set of wavelengths. The wavelength shifter 10 may be designed to stabilize and channelize the photonic signal 18. Typically, the channelized photonic signal 20 will have the same complexity as the photonic signal 18 and will be a composite signal if the photonic signal 18 is a composite signal. The channelized photonic signal 20 differs from the photonic signal 18 in that the wavelengths of the photonic signal 18 may be shifted to match a wavelength pattern associated with a channel. In some embodiments, the photonic signal 18 may also have a wavelength pattern but it is generally assumed that the wavelength patterns are externally originated and may be unknown to the system of interest.

The modulation synthesizer 12 may receive an optional data signal 22 and a shift signal 24. The modulation synthesizer may provide a modulation waveform 26 designed to channelize the photonic signal 18 via the modulation device 16. The optional data signal 22 may be used to pre-modulate the modulation waveform 26 and effectively encode data in the channelized photonic signal 20. Pre-modulation allows data encoding techniques such as Frequency Shift Keying, ON/OFF keying, and code division keying to be performed by the wavelength shifting modulation device.

Time-domain orthogonal codes may be directly used by the modulation synthesizer 12 when pre-modulating the modulation waveform. Frequency-domain orthogonal codes such as frequency shift keying Walsh codes may be converted to a time-domain waveform and used to pre-modulate the modulation waveform. Joint time-frequency codes may also be used. For example, one bits may be encoded by a positive frequency shift in an alternating ON-OFF pattern while zero bits may be encoded by a negative frequency shift in an alternating OFF-ON pattern.

The ability to simultaneously encode data, channelize and stabilize a photonic signal via a single modulation device has not been found in the art and appears to be unique to the wavelength shifter 10. In some embodiments, the optional data signal 22 is not used and the modulation synthesizer 12 may simply be a voltage-controlled quadrature oscillator.

The wavelength error detector 14 may monitor the channelized photonic signal 20 and provide a wavelength error signal 21 useful for correcting errors in wavelength. The wavelength error detector 14 may monitor a single channel or a representative channel of a group of active channels. While certain embodiments cannot independently shift and correct wavelength errors in separate channels (using a single wavelength shifter 10), wavelength errors may be minimized across multiple active channels (using a single wavelength shifter 10) by generating a wavelength error signal that is the weighted average of the wavelength error of each channel. Typically, if a group of channels is derived from the same laser or light source, selecting a representative channel may be just as effective and much less costly than generating an averaged wavelength error signal.

The wavelength shifter 10 allows stabilization of a single channel or group of channels without requiring direct control of a laser or light source. Separating stabilization from the actual laser device allows for greater flexibility in designing and deploying photonic systems.

Separating the wavelength error detector 14 from the synthesis and modulation functions of the wavelength shifter 10 also allows for system design flexibility. Depending on the application, the wavelength error detector 14 may operate about a wavelength that is fixed or tunable. The wavelength error detector 14 may be dedicated to a single wavelength shifter or shared among multiple wavelength shifters 10. The wavelength error detector 14 may also be dynamic and support wavelength signatures or patterns. Regardless of the application, the wavelength error signal 21 provides feedback to the modulation synthesizer 12 which may effect shifting, stabilization and channelization of the photonic signal 18.

Certain embodiments in accordance with the present invention use a modulation device to shift and stabilize the wavelength of a carrier. Data encoding may also be performed with the wavelength shifter 10 via an optional data signal 22. A shift signal 24 controls the extent by which a wavelength may be shifted by the wavelength shifter 10 (neglecting any wavelength error correction). The shift signal 24 may have a constant value or the shift signal 24 may be a dynamic signal with a spreading or gathering function.

Separating the shift signal 24 from the wavelength error signal 21 allows for greater control and flexibility of the wavelength shifter 10. Wavelength shifting of the photonic signal 18 may advantageously occur through either mechanism. For example, the shift signal 24 may correspond to a wavelength pattern, while the wavelength error signal 21 may provide fine tuning of the average wavelength of the channelized photonic signal 20. In the embodiments depicted in FIGS. 1–11, the shift signal 24 and the wavelength error signal 21 are equal and independent in their ability to effect a wavelength shift on the photonic signal 18 and thereby provide the channelized photonic signal 20.

The wavelength shifter 10 may be used to interface between systems with dissimilar channel wavelength patterns. For example, one system may use spread spectrum channels while another may use channels with fixed wavelengths. By providing a spreading function or conversely an unspreading function to the shift signal 24, the wavelength shifter 10 may be used to convert fixed wavelength channels to spread spectrum channels and vice versa. Conversion between two spread spectrum channels may occur by providing the difference of two spreading functions to the shift signal 24.

In certain embodiments, the shift signal 24 controls the amount of shift in units of frequency (Hz). In some embodiments, the shift signal 24 provides a shift range, allowing wavelength error correction to occur within that range. Specifying a shift range on the shift signal 24, allows the wavelength shifter 10 to lock onto a particular channel when wavelength shifting a composite photonic signal. Wavelength shifting a composite photonic signal without a shift range may result in channel wandering should a composite signal experience fading or some other kind of degradation.

The shift signal 24 may be data keyed instead of using the optional data signal 22. Data keying with the shift signal 24 effectively creates spread spectrum or frequency domain data keying. Frequency shift keying is perhaps the simplest form of frequency domain data keying wherein the shift signal 24 alternates between two shift values to encode the data. The shift signal 24 may be data keyed with binary codes such as Walsh codes. Continuous codes may also be used.

One operation, that may be used for processing signals and creating filters, is a delay and sum operation. By controlling the relative phase of summed signals various degrees of constructive and destructive interference may be accomplished at a particular wavelength or frequency. By splitting photonic waves into multiple paths of various delays and recombining the split waves onto a single path, filters of various types can be created.

One element used in accordance with the invention is a phase modulator. Phase modulators often vary the index of refraction of a particular section of a waveguide and may be controlled with an applied voltage. Changing the index of refraction effectively changes the propagation time or delay through a medium. The ability to dynamically control the delay of a path via an applied voltage adds additional power for processing photonic signals.

For example, a Mach-Zehnder modulator may split a photonic signal onto two complementary pathways of identical length each with a phase modulator. With no applied voltage, the split photonic signals arrive in phase and effectively sum to the original photonic signal. Symmetrically increasing the delay of one path and decreasing the delay of the other path (via the applied voltages) allows the amplitude of the combined photonic signal to be modulated. At a certain point the combined signals will be 180 degrees out of phase resulting in a zero amplitude signal known as a dark point.

Normally, amplitude modulation produces dual side bands resulting in wasted bandwidth. Quadrature modulation involves using two modulators that operate 90 degrees out of phase. Each modulator produces dual sidebands. Two of the sidebands cancel while two of the sidebands sum to create a single sideband.

Various modulation devices may be suitable for the modulation device 16. Suitable devices may include a quadrature Mach-Zehnder modulation device 16a, a phase modulation device 16b and a single Mach-Zehnder modulation device in concert with a phase modulator. Other possibilities include a single Mach-Zehnder modulation device followed by a filter, or a photonically driven device such as a stimulated Brillouin scatterer, a stimulated Raman scatterer, or a four-wave mixer. In certain embodiments, component cost can by reduced by selecting the modulation device 16 optimized for shifting within a specific frequency range.

Figure 2:
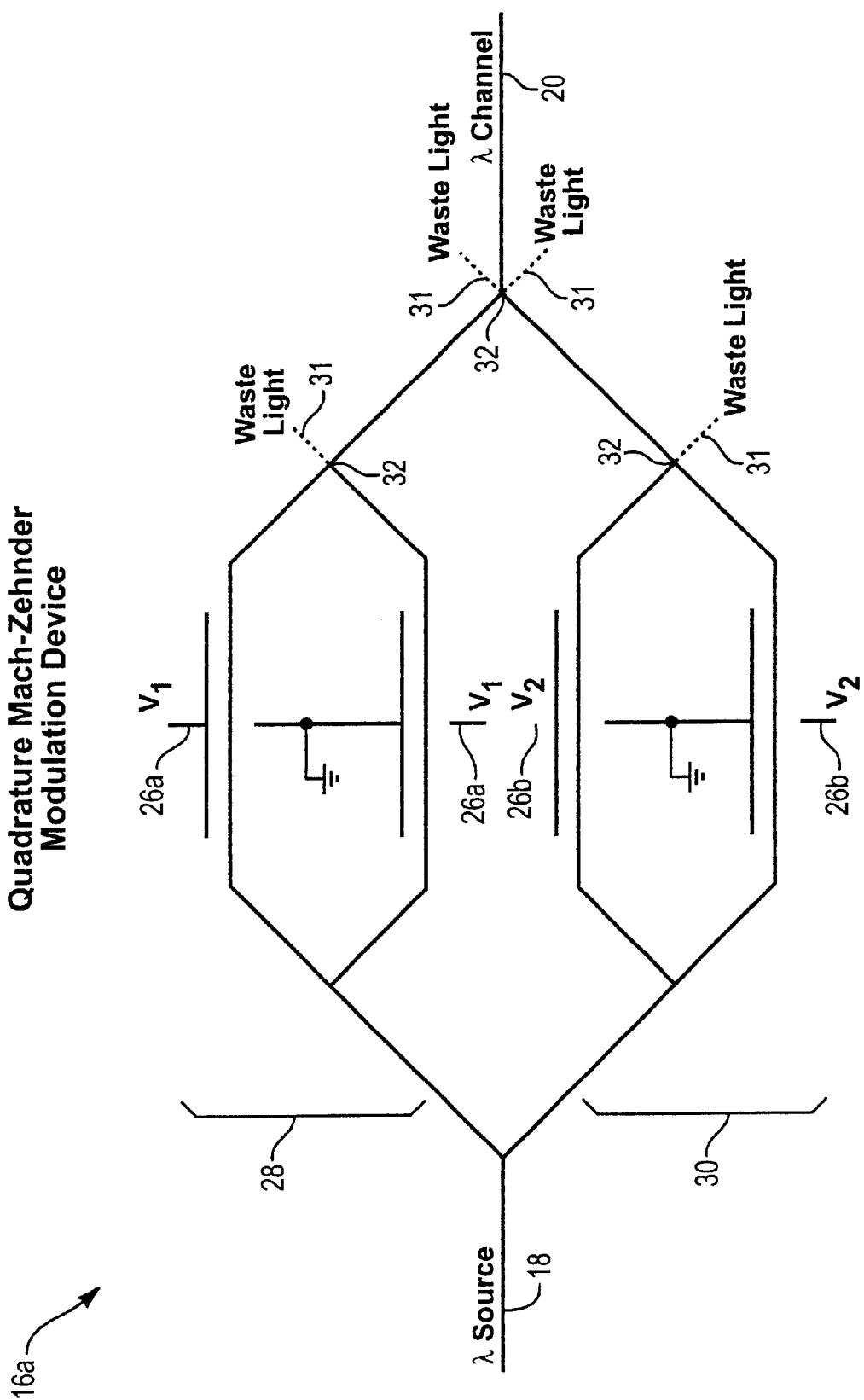
FIG. 2 is a schematic diagram of a quadrature Mach-Zehnder modulation device used in accordance with the invention.

Referring to FIG. 2, the modulation device used in certain embodiments may be the quadrature Mach-Zehnder modulation device 16a. A quadrature device facilitates wavelength shifting by quadrature or single sideband modulation. The quadrature Mach-Zehnder modulation device 16a may have an upper branch 28 and a lower branch 30. The upper branch 28 and the lower branch 30 may be complementary Mach-Zehnder modulators that perform in a quadrature mode when driven by a modulation waveform 26.

With a quadrature modulation device, the modulation waveform 26 may have a quadrature waveform component 26a and a quadrature waveform component 26b. Waste light 31 may be emitted at a branch junction 32. In some embodiments it may be desirable to use the waste light from the branch junction 32 to perform phase stabilization or other useful functions.

Figure 3:
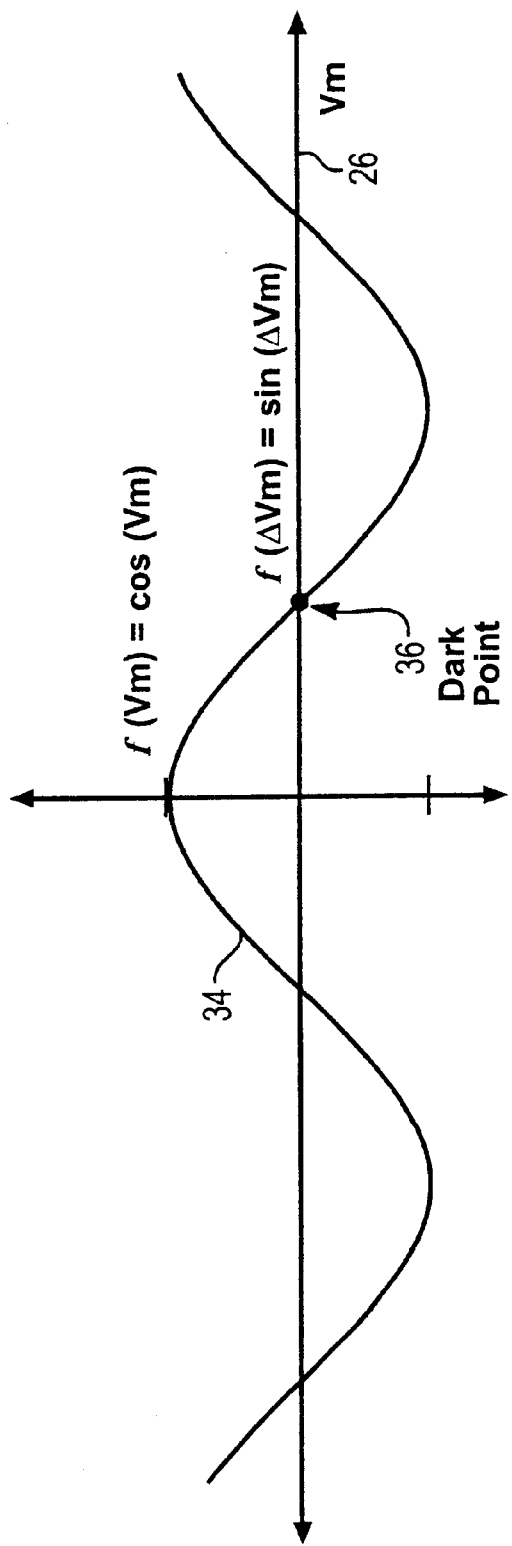
FIG. 3 is a graph of the Mach-Zehnder device transfer function in accordance with the device of FIG. 2.

Referring to FIG. 3, a transfer function 34 typical of the upper branch 28 and the lower branch 30 may be a function of the voltage of the modulation waveform 26. The transfer function 34 may correspond to a cosine wave. In certain embodiments, the modulation synthesizer 12 may provide a waveform optimized to for a particular modulation device 16. Proper biasing of the upper branch 28 and the lower branch 30 modulation waveform voltages allow each branch to operate at a dark point 36. Operating at the dark point 36 may be advantageous to reduce transmitted power and signal distortion.

In certain embodiments, applying a ramp function beginning at the dark point 36 produces a sine wave of negative polarity. Therefore, small fluctuations in quadrature waveform components 26a and 26b about the dark point 36, produce modulations that are substantially bipolar and linear. Small fluctuations in the quadrature waveform components 26a and 26b that are not biased to the dark point 36 may produce modulations that may be unipolar. Transmitted power may also be substantially increased. Larger amplitude fluctuations in the modulation waveform 26 may generate noise harmonics in the channelized photonic signal 20 due to the non-linearities in the upper branch 28 and the lower branch 30.

Noise harmonics in the channelized photonic signal 20 may be substantially eliminated by dividing the modulation waveform components 26a and 26b by the transfer function 34 of the upper branch 28 and the lower branch 30. Driving the depicted Mach-Zehnder quadrature modulation device 16a with waveform components 26a and 26b, that are triangular or sawtooth in shape (having maximum and minimum amplitudes corresponding to peaks and valleys in the transfer function 34), substantially eliminates the introduction of noise harmonics in the channelized photonic signal 20.

The modulation synthesizer 12 may be embodied in a variety of forms including discrete circuitry, digital logic, software modules within a processor (with a digital-analog converter to drive the modulation device), and custom chips. Regardless of the implementation scheme selected, the modulation synthesizer 12 may be designed to drive the modulation device 16 as controlled by the error signal 21 and the shift signal 24. Implementation details may be quite specific to the modulation device used and other factors such as bandwidth, cost, and response time.

Figure 4:
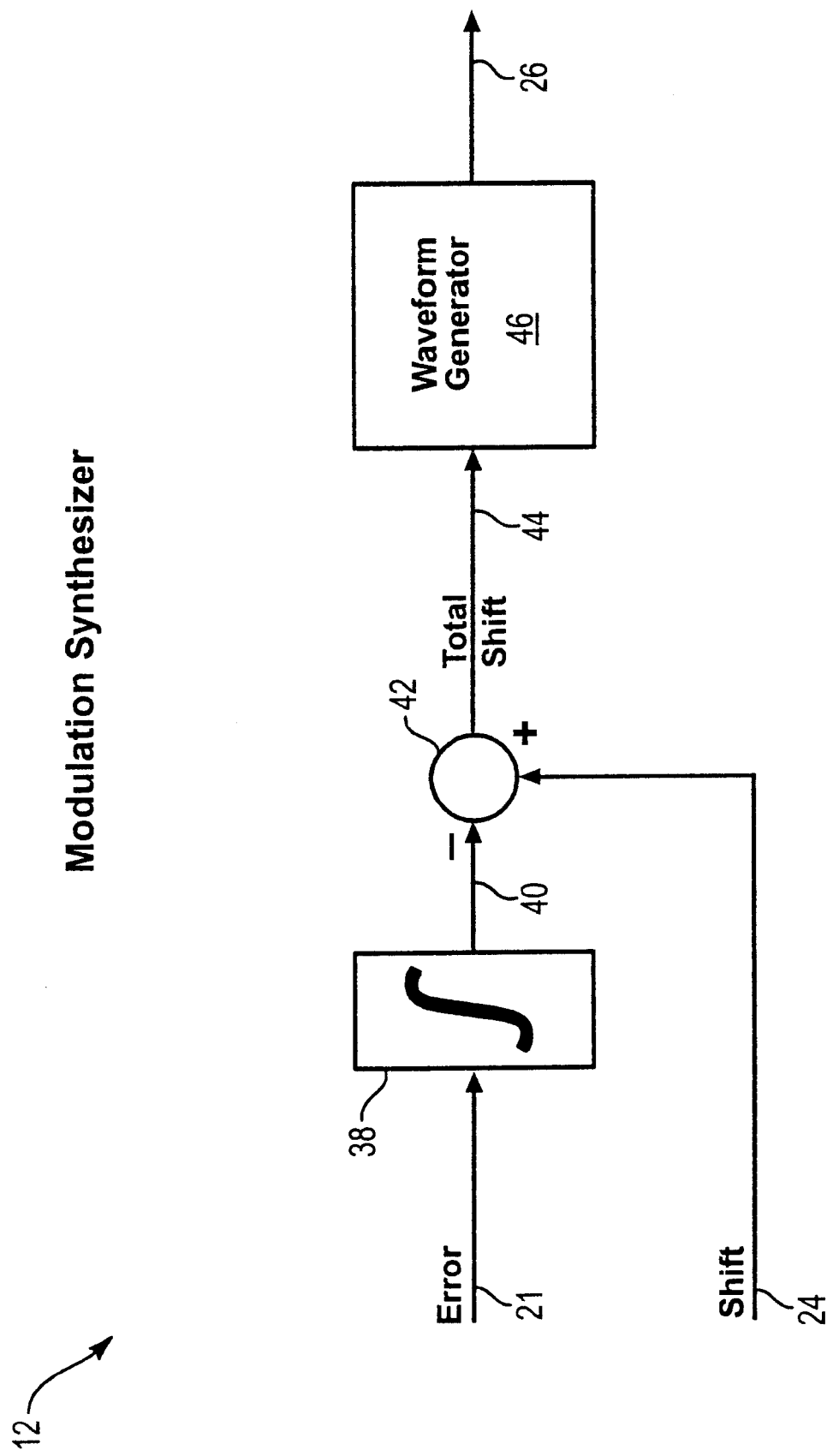
FIG. 4 is a schematic block diagram of a modulation synthesizer used in accordance with the invention.
Figure 5:
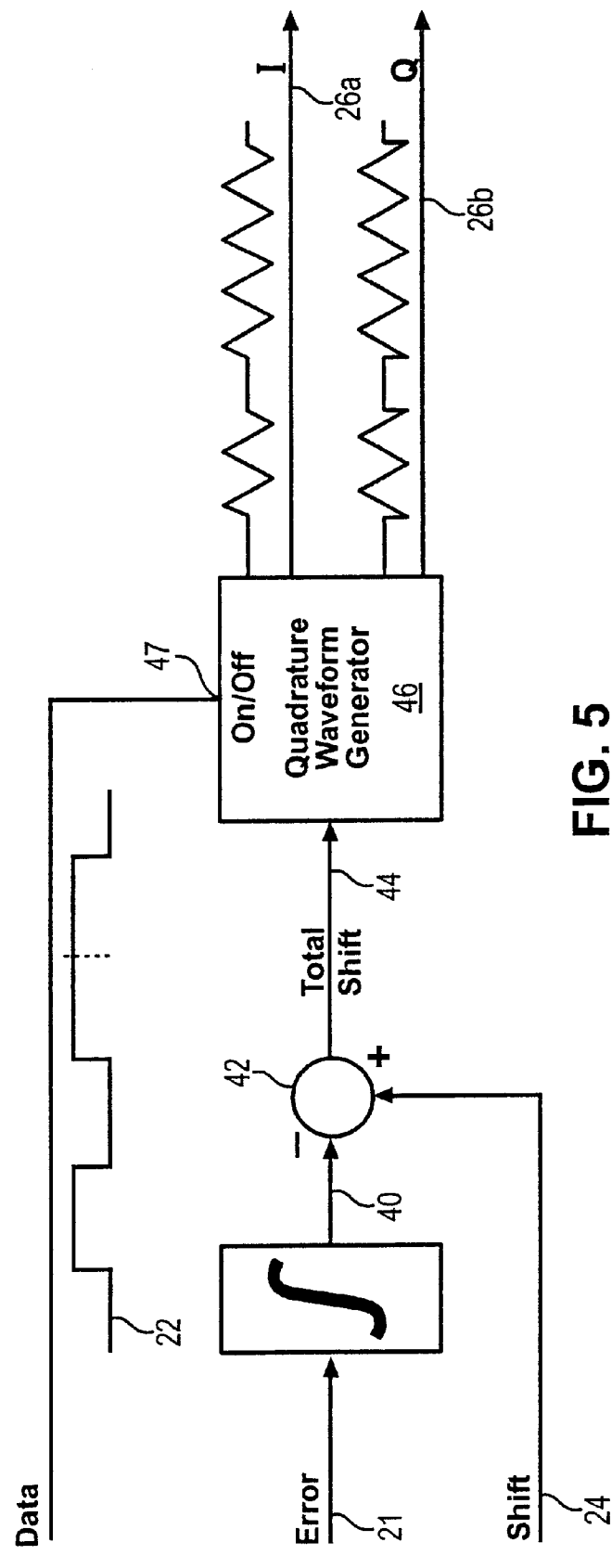
FIG. 5 is a schematic block diagram of an embodiment of a modulation synthesizer configured to perform ON/OFF keying in accordance with the invention.
Figure 7:
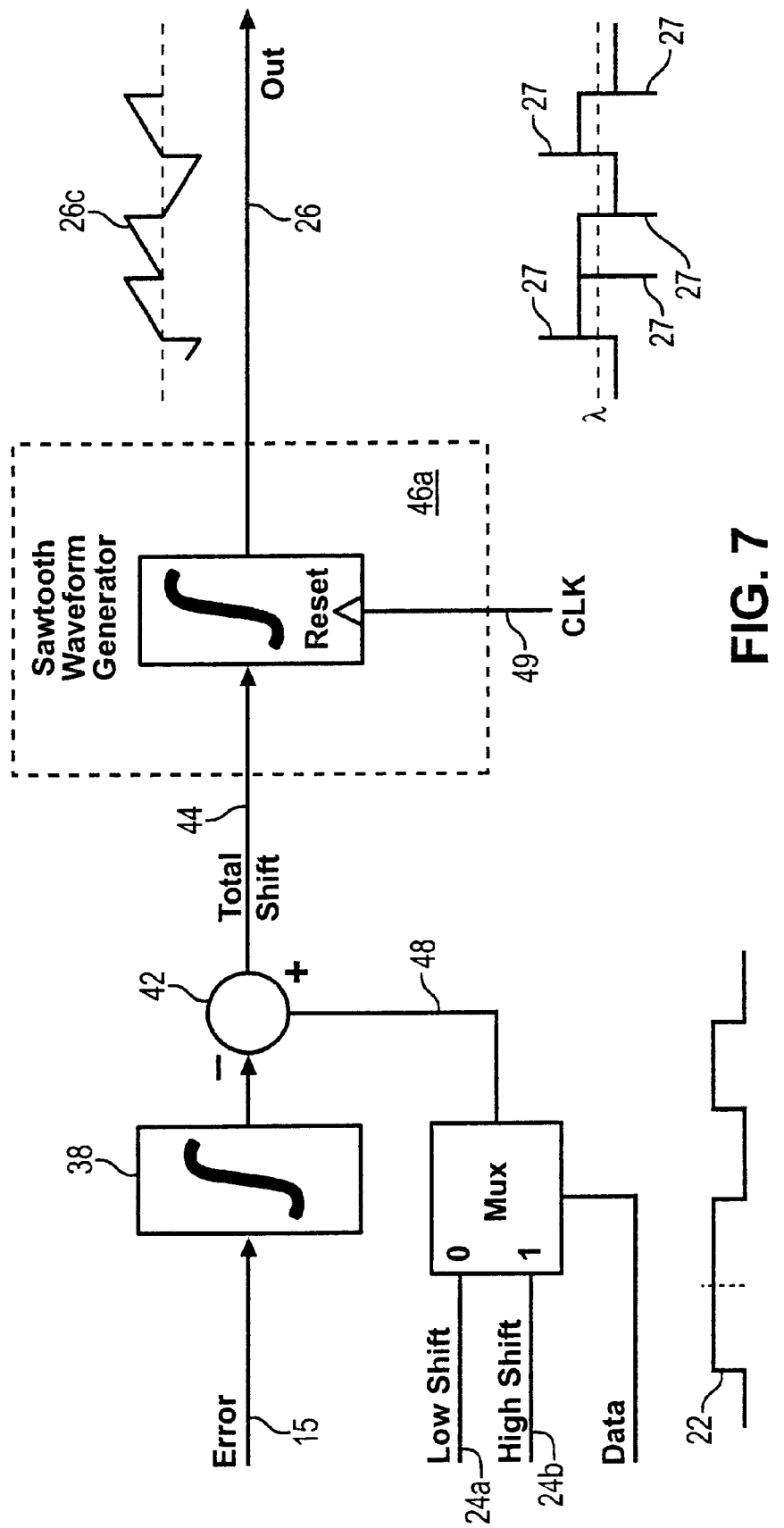
FIG. 7 is a schematic block diagram of an embodiment of a modulation synthesizer configured to perform frequency shift keying in accordance with the invention.

In particular, the method of data keying and the characteristics of the modulation device 16 may significantly affect the overall structure of the modulation synthesizer 12. With certain embodiments it may be beneficial to embed data keying within the shift signal 24 (external to the modulation synthesizer 12). FIGS. 4, 5 and 7 show three examples of a modulation synthesizer 12 that share certain common design elements with unique changes relevant to the respective method of data keying and the characteristics of the modulation device 16 used by each example.

Referring to FIG. 4 specifically, while referring generally to all the Figures, the modulation synthesizer 12 may include an integration unit 38. The integration unit integrates and may optionally filter the error signal 21 to provide an integrated error signal 40. For example, low-pass filtering of the error signal 21 may be used to dampen the response of the wavelength shifter 10 and prevent overshooting a design point. A summing unit 42 may sum the shift signal 24 with the integrated error signal 40 and provide a total shift signal 44. In some embodiments, the shift signal 24 may provide a lower shift 24a and an upper shift 24b to restrict the range of wavelength shifting. The summing unit 42 may be configured to confine the total shift signal 44 to the range specified by the lower shift 24a and the upper shift 24b.

Continuing to refer to FIG. 4 specifically, while referring generally to all the Figures, the waveform generator 46 receives a total shift signal 44 and generates the modulation waveform 26 relevant to the modulation device 16. Quadrature versions of the modulation device 16 may require a quadrature waveform with waveform components that are substantially 90 degrees out of phase.

Referring to FIG. 5, a quadrature version of the modulation synthesizer 12 may configure the waveform generator 46 to generate quadrature waveform components 26a and 26b that are shaped in a desired fashion, such as triangle waves. FIG. 5 also shows that ON/OFF data keying may be added to the modulation synthesizer 12 by operably connecting the data signal 22 to an ON/OFF input 47 of the waveform generator 46. Data keying may be accomplished by selectively setting the quadrature waveform components 26a and 26b to a value corresponding to the dark point 36 of the upper branch 28 and the lower branch 30. For example, the upper branch 28 and the lower branch 30 may be operably set at the dark point 36 when the ON/OFF input 47 is in the OFF position.

Figure 6:
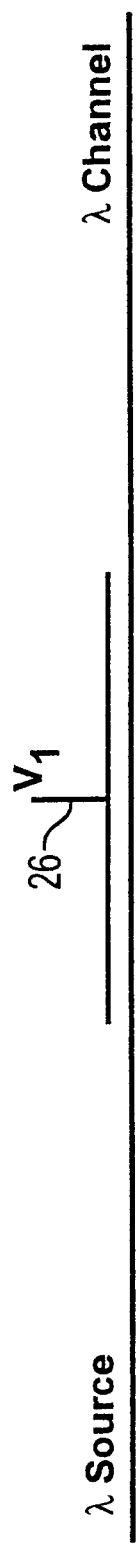
FIG. 6 is a schematic diagram of a phase modulation device used in accordance with the invention.

Referring to FIG. 6, the phase modulation device 16b may differ from the quadrature Mach-Zehnder device 16a. For example, quadrature or single sideband modulation may not be supported. Wavelength shifting may occur by applying an alternative waveshape, such as a ramp function, to the input. In the illustrated embodiment, the extent of wavelength shifting provided by the phase modulation device 16b may be substantially proportional to the slope of the ramp function.

Sustaining a ramp function may be problematic with a finite modulation waveform 26 and the phase modulation device 16b. Several techniques may be used to ensure that finite limits are maintained on the modulation waveform 26. For example, frequency shift keying may encode ones with a positive frequency shift and zeros with a negative frequency shift. Circuit modifications may be added to substantially eliminate the DC terms of the data signal. Data encoding techniques may be applied to limit the one's density of the data stream to an acceptable range. Each of these techniques may limit the range of wavelength shifting attainable by the wavelength shifter 10.

Another solution involves driving the phase modulation device 16b with a sawtooth waveform 26c. The sawtooth waveform 26c may produce an opposite polarity wavelength spike 27 corresponding to vertical edges of the sawtooth waveform 26c. The duration of the opposite polarity wavelength spike 27 may be short enough to be irrelevant. The opposite polarity wavelength spike 27 may also cause a wavelength shift large enough to momentarily move the wavelength of the channelized photonic signal 20 outside the transmission range of the system of interest. The opposite polarity wavelength spike 27 may also be advantageously used to provide a clock signal and/or synchronize multiple data streams.

Referring to FIG. 7, the modulation synthesizer 12 may be configured to support frequency shift keying. As compared to the embodiments of FIGS. 4 and 5, a multiplexer has been added and the shift signal expanded to a low shift 24a and a high shift 24b. In the depicted embodiment, the low shift 24a and the high shift 24b are negative and positive shifts as depicted (not necessarily of the same magnitude). The data signal 22 may multiplex between a low shift 24a and a high shift 24b to provide a data-keyed shift signal 48. A sawtooth waveform generator 46a may be a simple embodiment of a waveform generator 46 designed specifically to operate with the phase modulation device 16b. The modulation waveform 26 provided by the sawtooth waveform generator 46a may be restricted to a sawtooth wave. The sawtooth waveform generator 46 may integrate the total shift signal 44 until reset by a clock signal 49.

As mentioned previously, data keying may significantly affect the structure of the modulation synthesizer 16 specifically and the wavelength shifter 10 generally. In certain embodiments data keying may involve placing a separate phase modulation device 16b in series with the modulation device 16. Other embodiments may involve modifying the modulation device 16 to receive a data keying signal separate from the (wavelength shifting and stabilizing) modulation waveform 26. In many embodiments, however, information to control data keying, wavelength shifting, and wavelength stabilization may be embedded in the modulation waveform 26.

Figure 8:
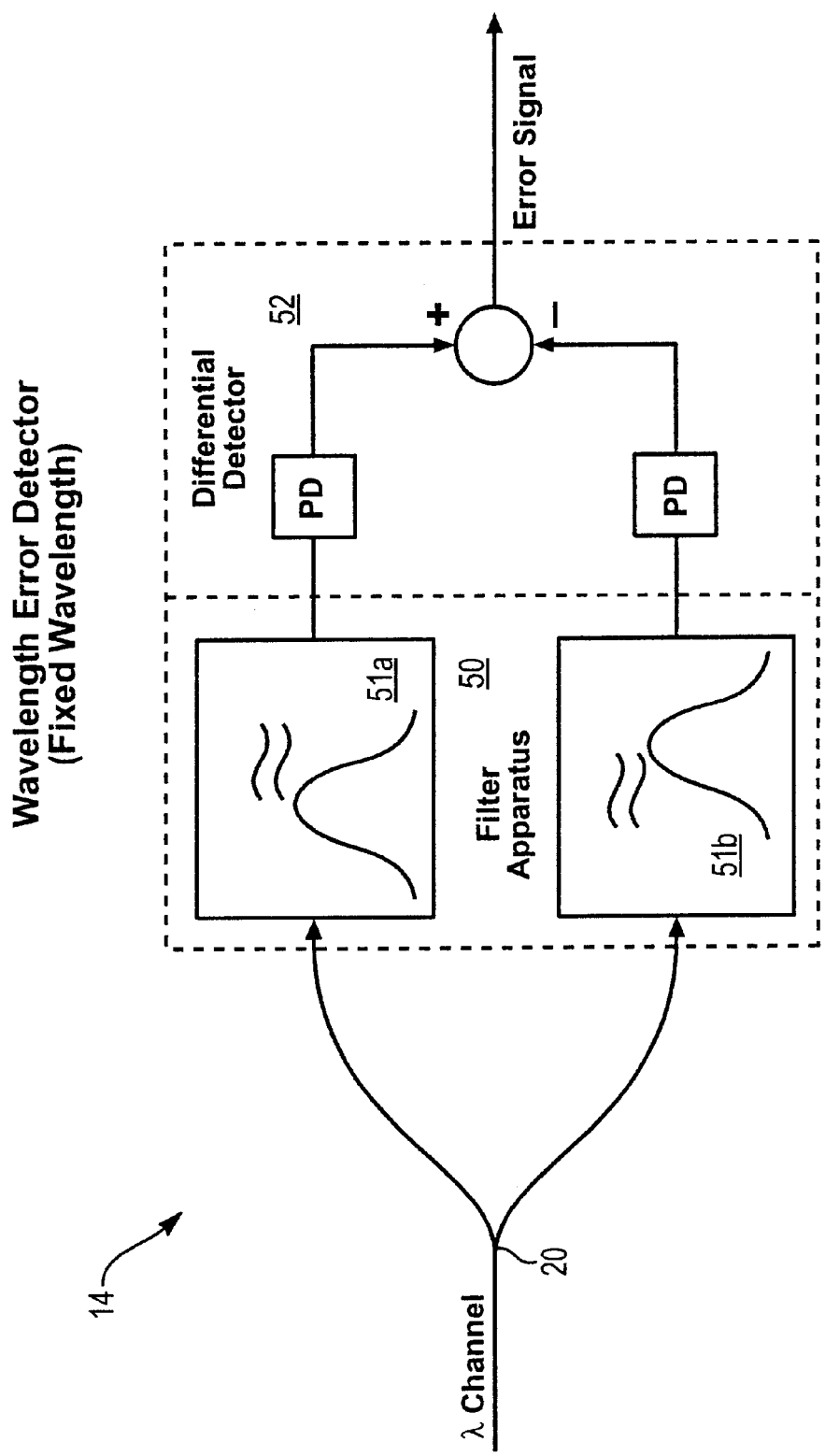
FIG. 8 is a schematic block diagram of a wavelength error detector in accordance with the invention.

Referring to FIG. 8 specifically, while referring generally to all the Figures, the wavelength error detector 14 may include a filter apparatus 50. In one embodiment the filter 50 may include a pair of matched filters 51a and 51b that are slightly offset in wavelength. The wavelength error detector 14 controls the stabilization performed by the wavelength shifter 10 and in certain embodiments may dramatically influence the effectiveness of the wavelength shifter 10.

A differential detector 52 may detect differences of intensity in the output of filter devices 51a and 51b. FIG. 8 depicts a pair of filter devices 51a and 51b, which may be fixed. Fixed filter devices may be sufficient in some applications and may be Bragg filters. In some embodiments, tunable Bragg filters with slightly offset tuning inputs may increase the variety of wavelength patterns supportable with the wavelength error detector 14.

Figure 9:
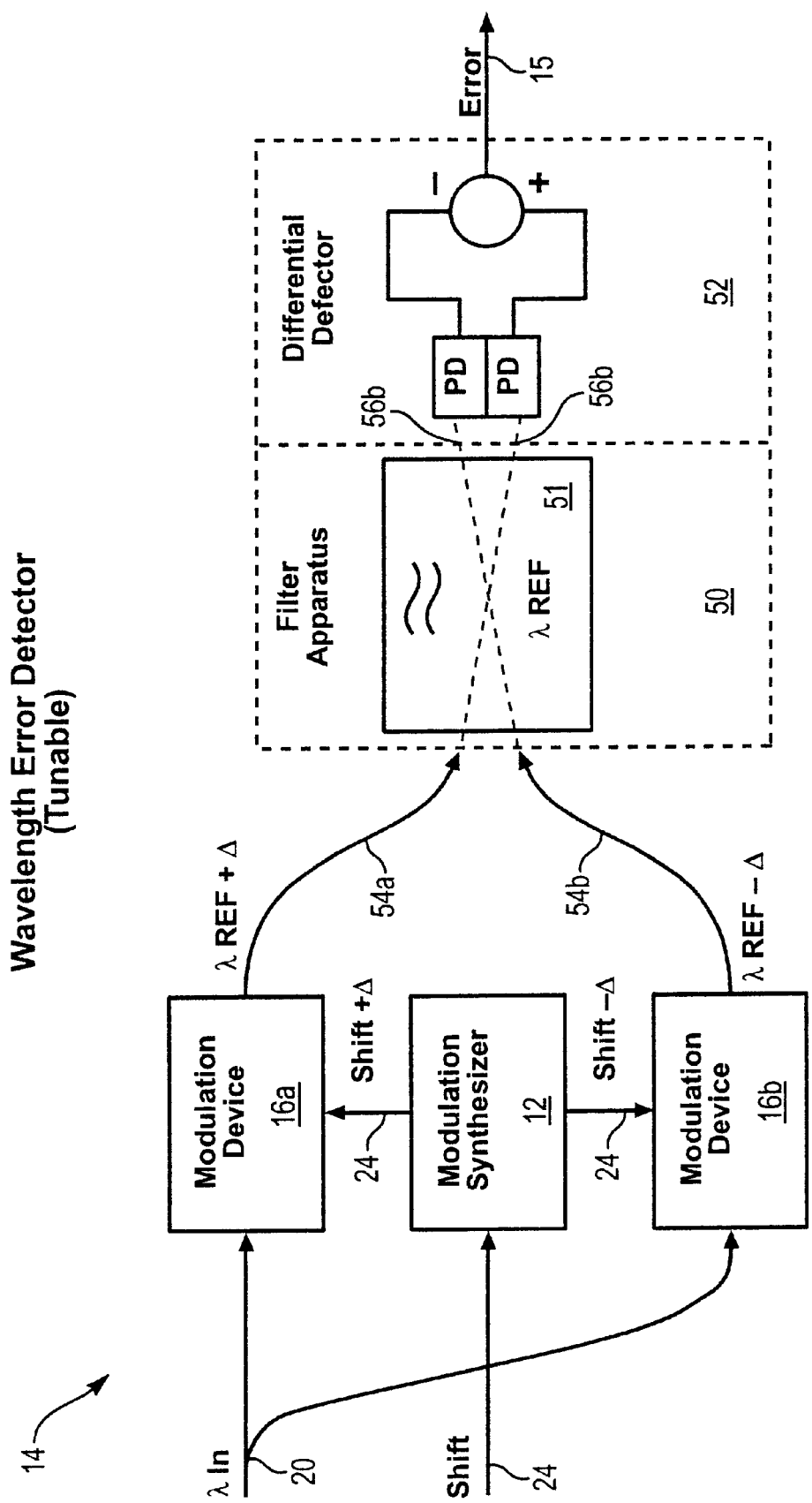
FIG. 9 is a schematic block diagram of a tunable wavelength error detector in accordance with the invention.

Referring to FIG. 9, a tunable version of the wavelength error detector 14 may be comprised of a complementary pair of modulation devices 16a and 16b configured to wavelength shift the channelized photonic signal 20 as directed by the modulation synthesizer 12. In one embodiment, the shift signal 24 carries a wavelength pattern corresponding to a wavelength pattern present on the channelized photonic signal 20.

A complementary pair of modulation devices 16a and 16b may be driven to wavelength shift by a common value corresponding to a wavelength pattern carried by the shift signal 24. Additionally, a slight wavelength offset may be produced between a shifted photonic signal 54a and a shifted photonic signal 54b. Wavelength shifting the channelized photonic signal 20 by slightly different amounts allows the use of a single filter device 51 in the filter apparatus 50 instead of the pair of matching filters devices 51a and 51b slightly offset in wavelength. Filter 51 may be a standard Bragg filter.

Figure 10:
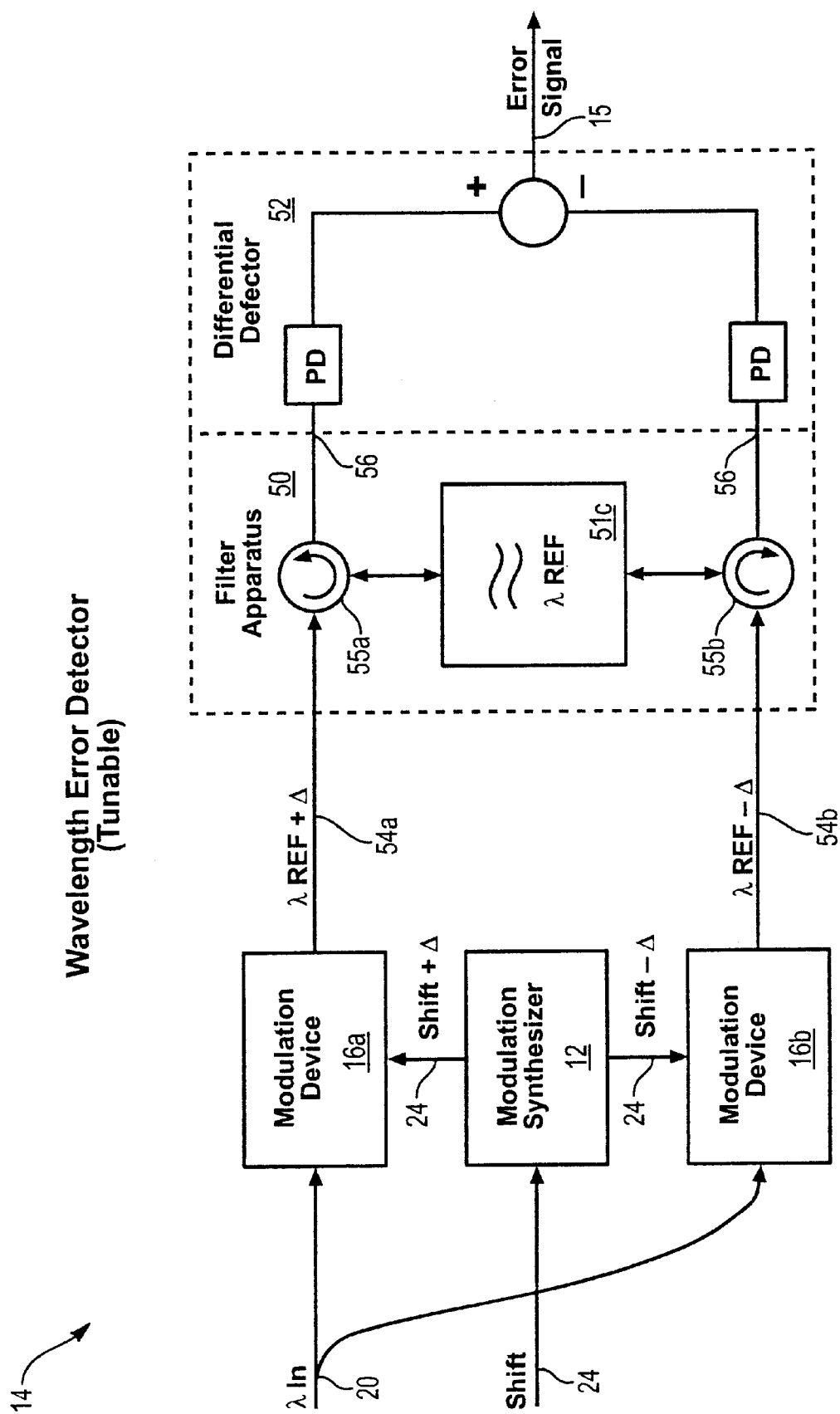
FIG. 10 is a schematic block diagram of a tunable wavelength error detector in accordance with the invention.

Referring to FIG. 10, another tunable version of the wavelength error detector 14 may include a filter apparatus 50 having a complementary pair of circulators 55a and 55b, and a bidirectional filter 51c. The bidirectional filter 51c may be a standard Bragg filter. The complementary pair of circulators 55a, 55b may direct the shifted photonic signal 54a and the shifted photonic signal 54b to opposite ends of the bidirectional filter device 51c. The complementary pair of circulators 55a and 55b may also direct the reflected portion of the shifted photonic signal 54a and the reflected portion of the shifted photonic signal 54b to the differential detector 52.

The tunable versions of the wavelength error detector 14 depicted in FIGS. 9 and 10 may be designed to create a time-varying wavelength reference using a standard fixed filter device such as a Bragg filter. For example, the channelized photonic signal 20 received by the wavelength error detector 14 may have a wavelength pattern characterized by a spreading function. The complementary pair of modulation devices 16a, 16b may be driven by a modulation waveform characterized by a gathering function corresponding to the spreading function of the channelized photonic signal 20. By using a gathering function that essentially "unspreads" the spreading function, the shifted photonic signals 54a, 54b may be substantially fixed in wavelength. Having substantially fixed wavelengths for the shifted photonic signals 54a, 54b may facilitate using a standard fixed filter device such as a Bragg filter in the wavelength error detector 10.

Some wavelength variability between filter devices may be expected. Additionally, filter device wavelengths are often temperature sensitive. In certain embodiments, temperature- and device-dependent variations between standard filter devices 51 may be compensated. One method of compensation is further adjusting the value of the shift signal 24 of the modulation synthesizer 12 to account for temperature- and device-dependent variations. Thus a modulation synthesizer 12 becomes a temperature-dependent-device-compensation mechanism. A temperature-dependent-device-compensation shift may be stored and accessed externally or internally to the modulation synthesizer 12.

In some embodiments, a tunable version of the wavelength error detector may be shared among multiple wavelength shifters 10. For example, the channelized photonic signals 20 from multiple wavelength shifters 10 may be combined onto a single fiber. On that fiber, a single wavelength error detector 14 may be configured to time-division multiplex between the various channels and provide a time-division-multiplexed wavelength error signal. Additionally, the modulation synthesizer 12 may be configured to sample and hold the wavelength error signal 21 at an appropriate time.

The wavelength shifter 10 provides a convenient building block for creating photonic systems including transmission, switching and multiplexing equipment. Photonic data streams and/or photonic carriers arriving in a photonic signal 18 may be shifted, stabilized and channelized to become the channelized photonic signal 20. This may be done without conversion to the electronic domain. Photonic data rates and throughput may be maintained, while complex control features may be handled in the electronic domain.

Another feature of the wavelength shifter 10 is the ability to transparently pass the photonic signal 18 without knowledge of the encoding techniques or format used to create the photonic signal 18. The transparent nature of the wavelength shifter 10 and the ability to channelize photonic signals facilitates the transmission, multiplexing and switching of an extremely wide range of photonic signals.

The wavelength shifter 10 may also compensate for wavelength variability of existing photonic streams without retransmission. Data may be pre-encoded into the photonic signal 18, or data may be encoded onto the channelized photonic signal 20. Encoding may occur via the shift signal 24 or the optional data signal 22.

Figure 11:
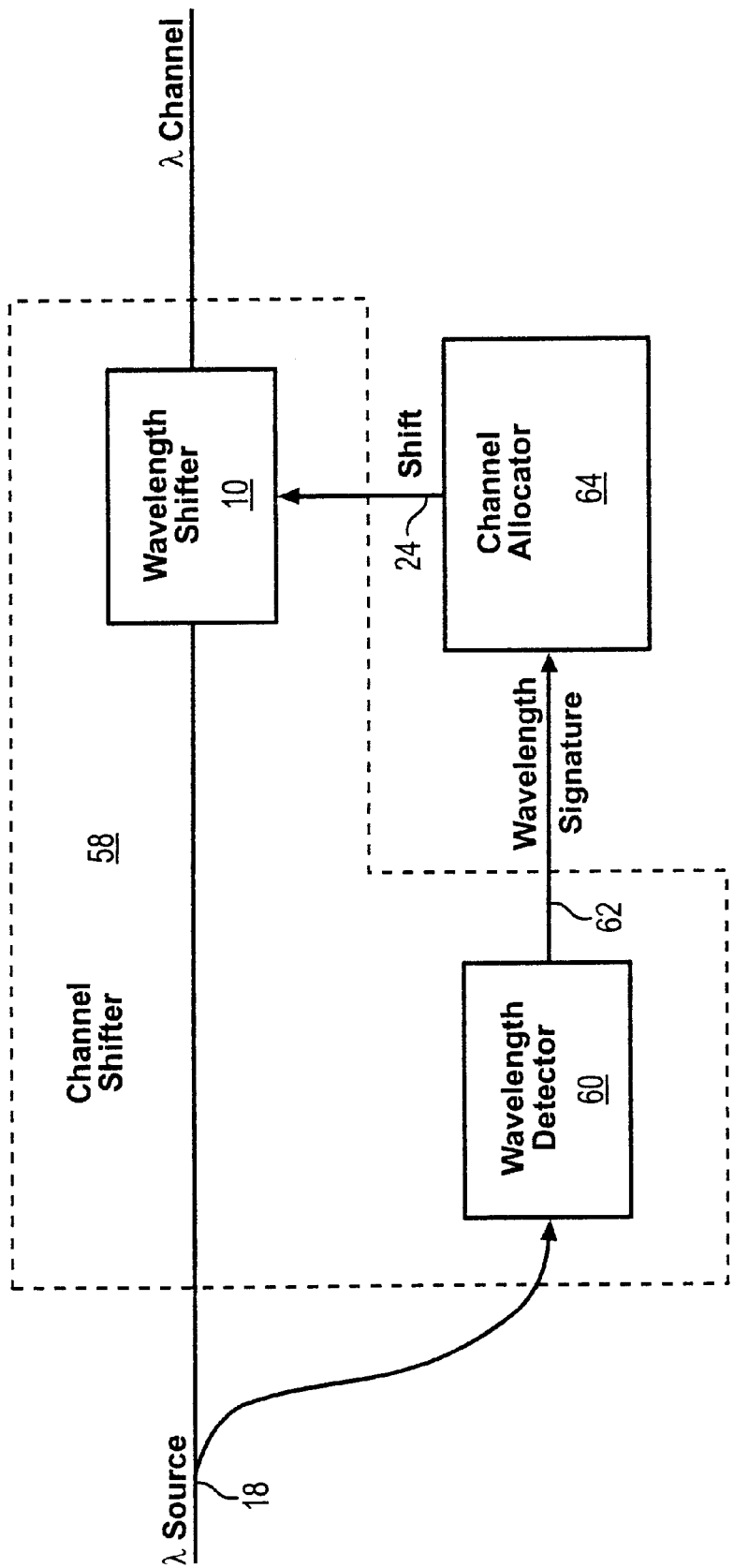
FIG. 11 is a schematic block diagram of a channel allocation mechanism in accordance with the invention.

Referring to FIG. 11, a channel allocation mechanism may automatically channelize and transparently transmit data-encoded photonic streams across a network of photonic equipment without prior knowledge of the carrier wavelengths and data encoding techniques. A channel shifter 58 may have a wavelength detector 60 to receive the photonic signal 18, or the channelized photonic signal 20, and provide a wavelength signature 62.

In certain embodiments, the wavelength signature 62 captures the essential wavelength characteristics of each carrier in a composite or non-composite photonic signal. The channel shifter 58 may also include a wavelength shifter 10 configured to receive the photonic signal 18, or the channelized photonic signal 20, as an input and provide the channelized photonic signal 20 as an output. A channel allocator 64 may be configured to receive the wavelength signature 62 and provide a shift signal 24 that directs the photonic signal 18 or the channelized photonic signal 20 into an available channel.

In some embodiments, the channel allocator 64 may be shared by all the channel shifters 58 common to a system. Sharing the channel allocator 64 simplifies resource allocation, relieves contention and resolves update and data synchronization issues. Multiple channel allocators 64 may also coordinate and update through a variety of methods.

One distributed solution involves assigning a local pool of identified channels to each channel allocator. When a channel allocator exhausts the local pool of channels, a message may be sent to other channel allocators requesting borrowing of a channel from their pool. The request may be accomodated, brokered, negotiated, denied or the like. Regardless of the method relied upon, the channel allocator 64 provides a shift signal to the channel shifter 58. The shift signal shifts the photonic signal 18 or the channelized photonic signal 20 into an available channel.

Figure 12:
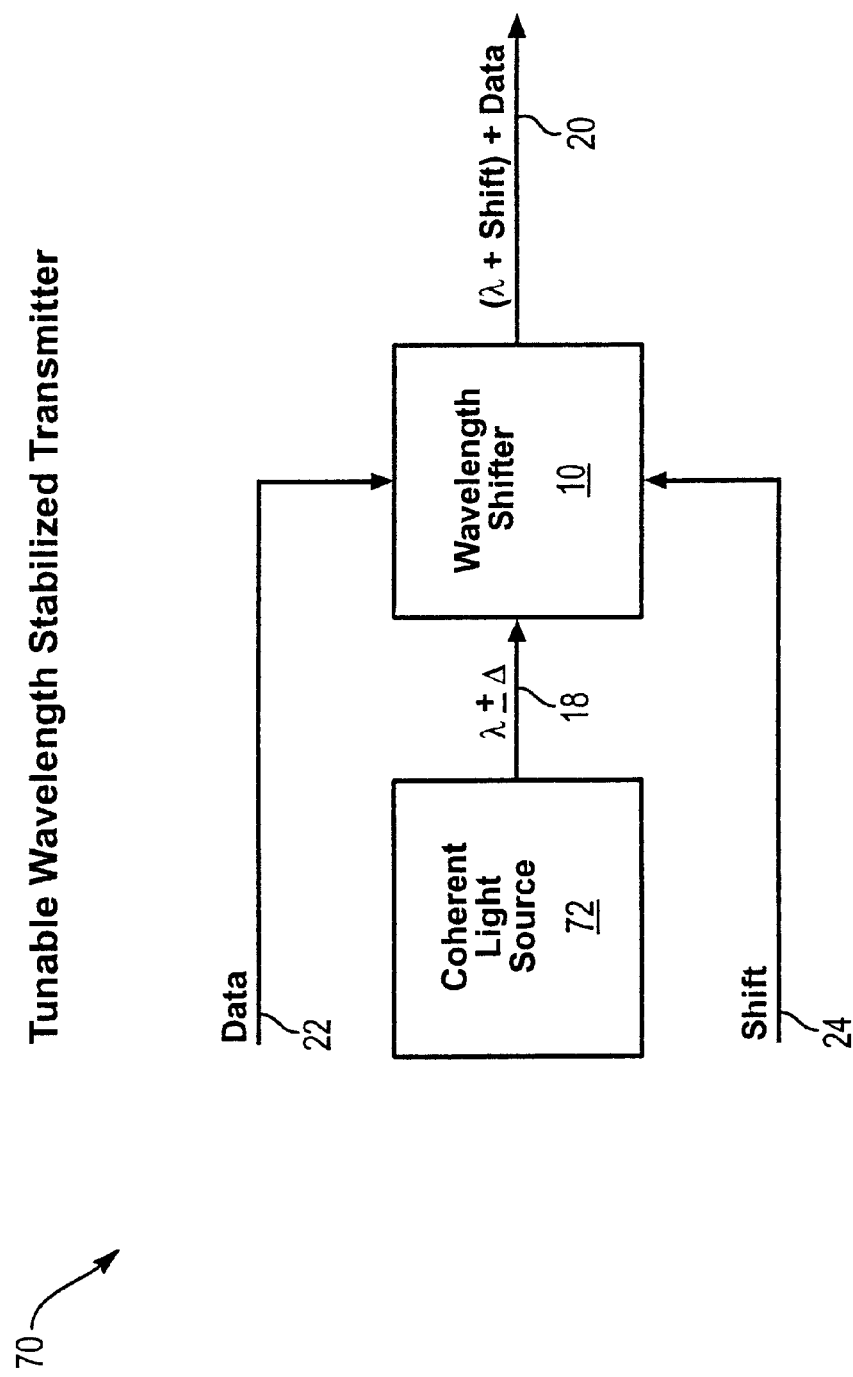
FIG. 12 is a schematic block diagram of a tunable wavelength stabilized transmitter in accordance with the invention.

Referring to FIG. 12, a tunable photonic transmitter 70 may include a coherent light source 72 and a wavelength shifter 10. The photonic signal 18 provided by the coherent light source 72 may have a limited coherence length. The photonic signal 18 may have wavelength jitter sufficient to be unacceptable for a particular application. Additionally, the wavelength of the photonic signal 18 may be offset from the desired wavelength.

The tunable photonic transmitter 70 may shift and stabilize the photonic signal 18 via the wavelength shifter 10 and provide the channelized photonic signal 20. The tunable photonic transmitter 70 may also encode the data signal 22 into the channelized photonic signal 20. The channelized photonic signal 20 may be a spread spectrum channel.

An ability to encode, shift and stabilize the photonic signal 18 independent of the coherent light source 72 may provide additional benefits over standard photonic transmitting circuits. The coherent light source 72 need not be tunable, stable or precise. The coherent light source 72 may be physically and electronically separated from the rest of the photonic transmitter 70. A single optical fiber may connect the coherent light source 72 with the wavelength shifter 10. Performance specifications of the channelized photonic signal 20 may be determined primarily by the electronic circuitry of wavelength shifter 10 rather than the photonics of the coherent light source 72.

Figure 13:
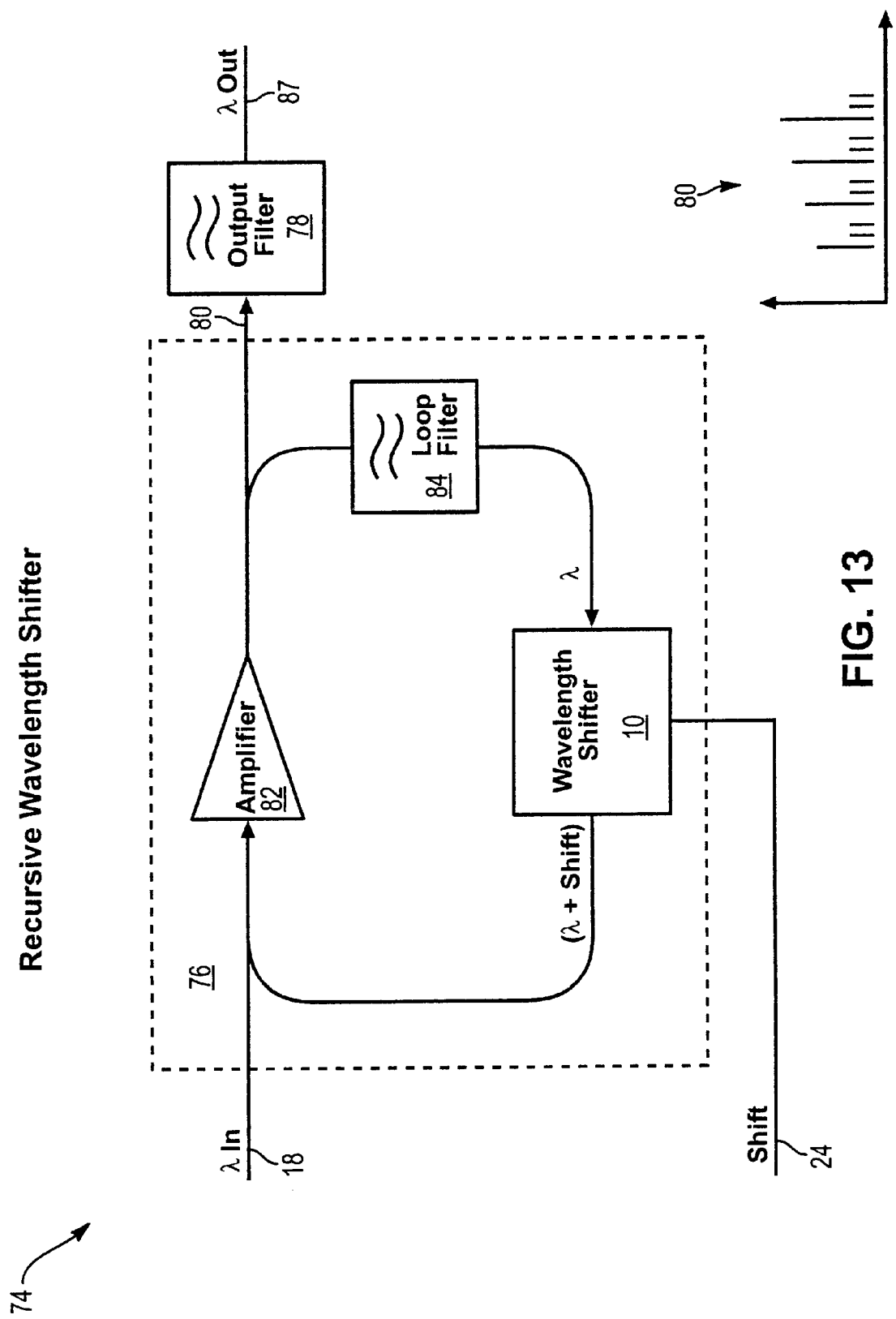
FIG. 13 is a schematic block diagram of a recursive wavelength shifter in accordance with the invention.

Referring to FIG. 13, a recursive wavelength shifter 74 may include a shifting loop 76 and an output filter 78. The shifting loop 76 may receive the photonic signal 18, having one or more wavelengths, and provide a photonic signal 18 with a spectral pattern 80. The spectral pattern 80 may have increasing or diminishing spectral tilt. The spacing and number of wavelengths of the spectral pattern 80 may be varied by the shift signal 24.

The shifting loop 76 may include an amplifier 82, a loop filter 84, and the wavelength shifter 10. The gain of the amplifier 82 may compensate for losses in the shifting loop 76 and contribute to the amount of spectral tilt in the spectral pattern 80. The loop filter 84 may shape the spectral pattern 80 with an arbitrary spectral envelope.

Figure 14:
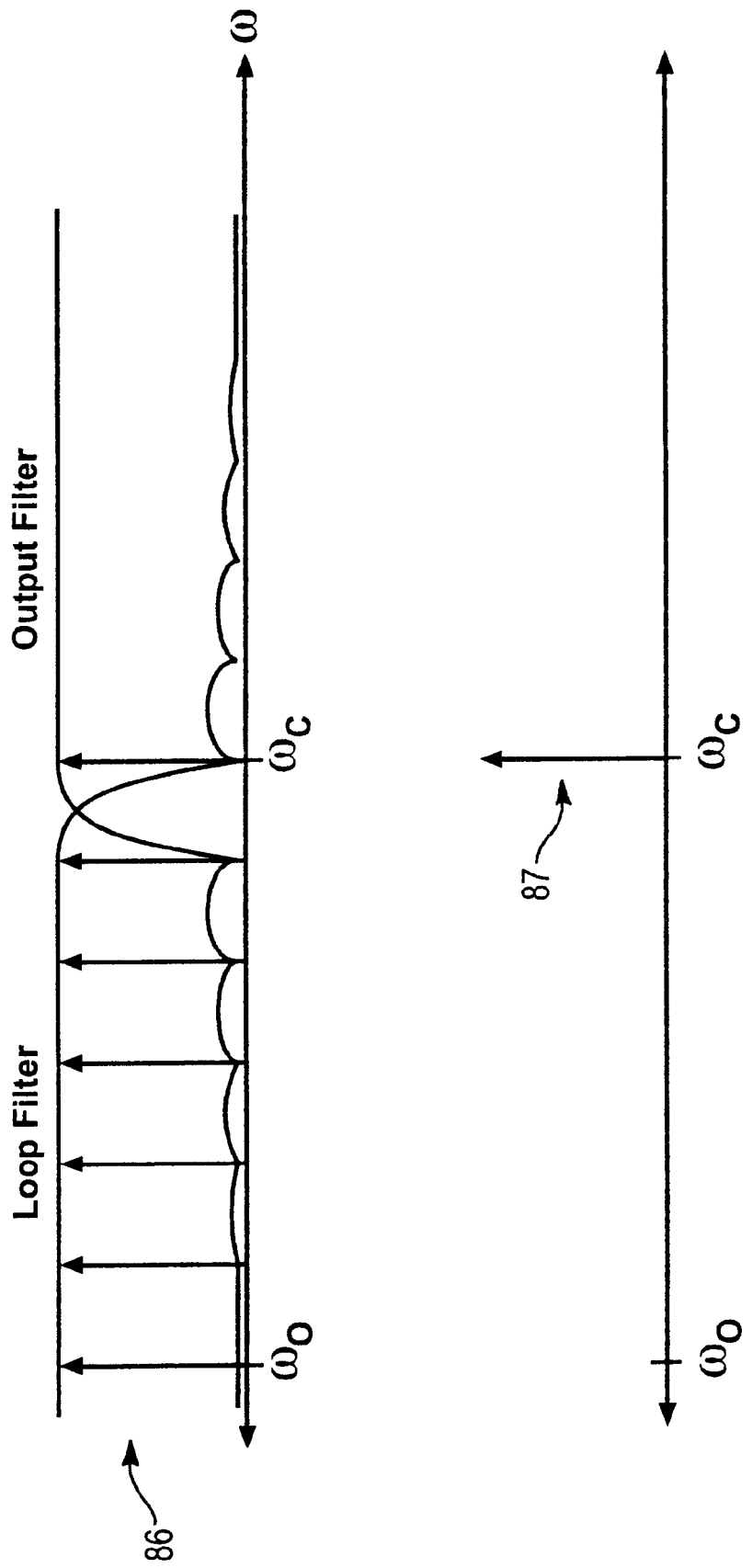
FIG. 14 is a set of frequency domain graphs of several signals associated with one embodiment of the recursive wavelength shifter depicted in FIG. 13.

Referring to FIG. 14 while also referring to FIG. 13, some embodiments the shifting loop 76 effectively generate a spectral comb 86. The spacing of the "teeth" of the spectral comb 86 may be controlled by the shift signal 24. In other embodiments the spectral pattern 80 may be repeating and continuous instead of having discrete "teeth." The shape of the repeating portion of the spectral pattern 80 may be provided by the photonic signal 18.

The output filter 78 may receive a photonic signal with the spectral pattern 80 and provide a spectrally shaped photonic signal 87. As shown in FIG. 14, the output filter 78 may select one tooth or region from the spectral pattern 80 and substantially suppress other teeth or regions of the spectral pattern 80. The recursive wavelength shifter 74 may include multiple output filters 78. Each output filter 78 may select a different tooth or region and provide a unique spectrally shaped photonic signal 87.

From the above discussion, it will be appreciated that the present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for providing a wavelength shifted and stabilized photonic signal, the method comprising:

providing a photonic input signal comprising at least one channel, each channel having a wavelength that is definable as a function of time;

providing a modulation waveform configured to shift the wavelength of the photonic input signal;

modulating the photonic input signal with the modulation waveform to shift the wavelength of each channel of the photonic input signal, thereby providing a photonic output signal comprising at least one channel, each channel having a wavelength that is definable as a function of time;

providing a wavelength reference;

comparing the wavelength reference with at least one channel of the photonic output signal to thereby providing an error signal configured to correct the wavelength of at least one channel of the photonic output signal;

adjusting the modulation waveform in accordance with the error signal; and modulating the photonic input signal with the modulation waveform to correct the wavelength of the photonic output signal.

2. The method of claim 1, further comprising:

providing a data signal, and pre-modulating the modulation waveform in accordance therewith to encode the data signal into the photonic output signal.

3. The method of claim 2, wherein the data signal is encoded into the photonic output signal using Frequency Shift Keying.

4. The method of claim 3, wherein the Frequency Shift Keying comprises orthogonal codes.

5. The method of claim 2, wherein the data signal is encoded into the photonic output signal using ON/OFF Keying.

6. The method of claim 2, wherein the data signal is encoded into the photonic output signal by pre-modulating with orthogonal codes.

7. The method of claim 1, further comprising:
providing a shift signal; and
shifting the wavelength of the photonic output signal with respect to the wavelength of the photonic input signal, in proportion to the shift signal.

8. The method of claim 7, wherein the shift signal comprises a spreading function.

9. The method of claim 7, wherein the shift signal comprises a gathering function.

10. The method of claim 7, wherein the shift signal comprises the difference of two spreading functions.

11. The method of claim 7, wherein the shift signal comprises an allowable range of wavelength shifts.

12. The method of claim 1, wherein modulating the photonic input signal with the modulation waveform comprises phase modulation.

13. The method of claim 1, wherein modulating the photonic input signal with the modulation waveform comprises quadrature amplitude modulation.

14. The method of claim 13, wherein the modulation waveform is a quadrature waveform comprising first and second waveform components that are substantially 90 degrees out of phase.

15. The method of claim 14, wherein the first and second waveform components are substantially sinusoids divided by a transfer function of a modulation device.

16. The method of claim 14, wherein the first and second waveforms are substantially sawtooth in shape.

17. The method of claim 14, wherein the first and second waveforms are substantially triangular in shape.

18. The method of claim 1, wherein the modulation waveform is substantially sawtooth in shape.

19. The method of claim 1, wherein the modulation waveform is substantially triangular in shape.

20. The method of claim 1, wherein the wavelength reference is a wavelength pattern.

21. The method of claim 1, wherein the photonic output signal comprises a representative channel, and the wavelength reference is compared with the wavelength of the representative channel to provide an error signal configured to correct the wavelength of the representative channel of the photonic output signal.

22. The method of claim 1, wherein the wavelength reference is compared with the wavelength of multiple channels to provide an error signal configured to correct the wavelength of multiple channels of the photonic output signal.

* * * * *